United States Patent
Ishii

(10) Patent No.: US 7,570,577 B2
(45) Date of Patent: Aug. 4, 2009

(54) APPARATUS, METHOD, AND PROGRAM FOR DETECTING COMMUNICATION PARAMETER

(75) Inventor: Hiroyuki Ishii, Tokyo (JP)

(73) Assignee: NEC Corporation (JP)

( * ) Notice: Subject to any disclaimer, the term of this patent is extended or adjusted under 35 U.S.C. 154(b) by 707 days.

(21) Appl. No.: 11/224,794

(22) Filed: Sep. 13, 2005

(65) Prior Publication Data

US 2007/0058758 A1    Mar. 15, 2007

(51) Int. Cl.
- H04L 5/04    (2006.01)
- H04B 7/216   (2006.01)
- H04B 1/00    (2006.01)
- H04J 11/00   (2006.01)

(52) U.S. Cl. .................. 370/204; 370/208; 370/342; 375/142

(58) Field of Classification Search .................. 370/252, 370/320, 335, 342, 441, 479; 375/142–152, 375/343

See application file for complete search history.

(56) References Cited

U.S. PATENT DOCUMENTS

| | | | |
|---|---|---|---|
| 6,654,429 B1 * | 11/2003 | Li | 375/316 |
| 7,170,945 B2 * | 1/2007 | Blat | 375/260 |
| 7,292,651 B2 * | 11/2007 | Li | 375/316 |
| 2006/0140293 A1 * | 6/2006 | Lai et al. | 375/260 |
| 2007/0086329 A1 * | 4/2007 | Glazko et al. | 370/208 |
| 2008/0107191 A1 * | 5/2008 | Ishii | 375/260 |
| 2009/0067515 A1 * | 3/2009 | Galperin et al. | 375/260 |

FOREIGN PATENT DOCUMENTS

| | | |
|---|---|---|
| JP | H08-125630 | 5/1996 |
| JP | 2001-086171 A | 3/2001 |
| JP | 2001-211137 | 8/2001 |
| JP | 2002-232389 | 8/2002 |
| JP | 2003-264527 | 9/2003 |
| JP | 2003-319005 | 11/2003 |

OTHER PUBLICATIONS

IEEE Standard 802.11a-1999 (Supplement to IEEE Standard 802.11-1999), Part II: Wireless LAN Medium Access Control (MAC) and Physical Layer (PHY) specifications: Highs-speed Physical Layer in the GHZ Band, pp. 1-82 (Copyright 1999).
Ochi Hiroshi, OFDM System Technology and MATLAB Simulation Guide, pp. 53-71 (published by TRICEPS, Inc.).

\* cited by examiner

*Primary Examiner*—Chi H Pham
*Assistant Examiner*—Tri H Phan
(74) *Attorney, Agent, or Firm*—Dickstein, Shapiro, LLP.

(57) ABSTRACT

A correlation signal generating circuit generates a duplicate signal for correlation processing based on a multiplex duplication signal. An autocorrelation circuit performs autocorrelation processing through sliding processing of the duplicate signal with respect to a received signal. An Nd detecting circuit detects the length of the data symbol by detecting a correlation value peak obtained based on the guard interval symbols. A data correlation circuit performs mutual correlation processing on the extracted data through the sliding processing by changing the window sizes. An Ng detecting circuit detects the length of the guard interval symbol by detecting the correlation value peak which is obtained when the guard interval symbol length and the window size become consistent.

12 Claims, 13 Drawing Sheets

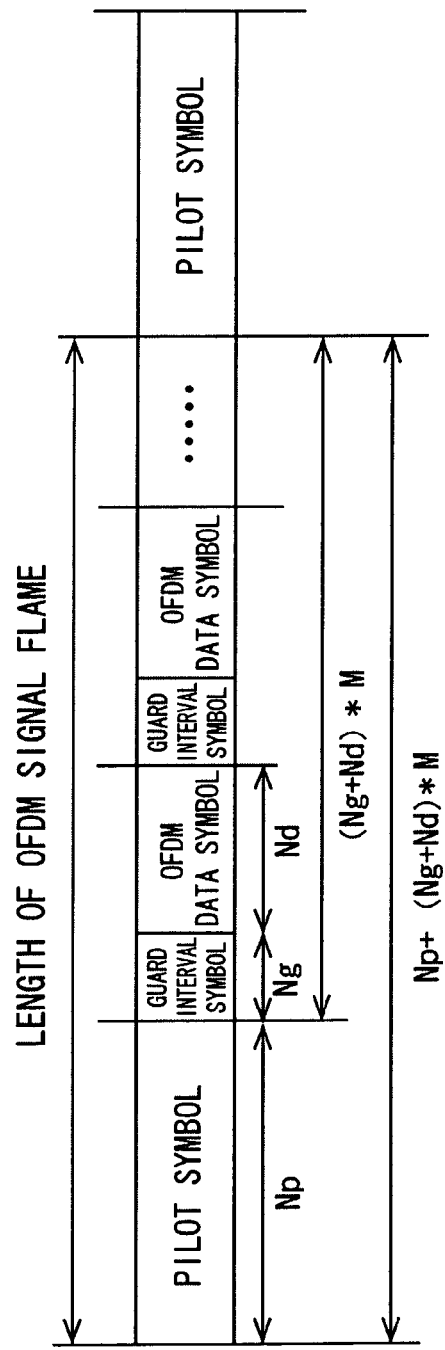
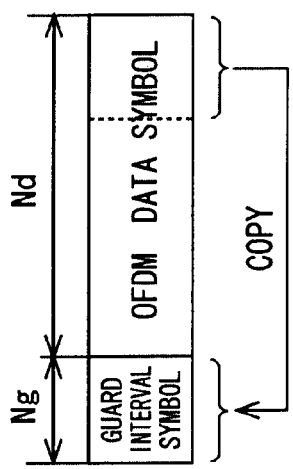
FIG. 1A PRIOR ART
FIG. 1B

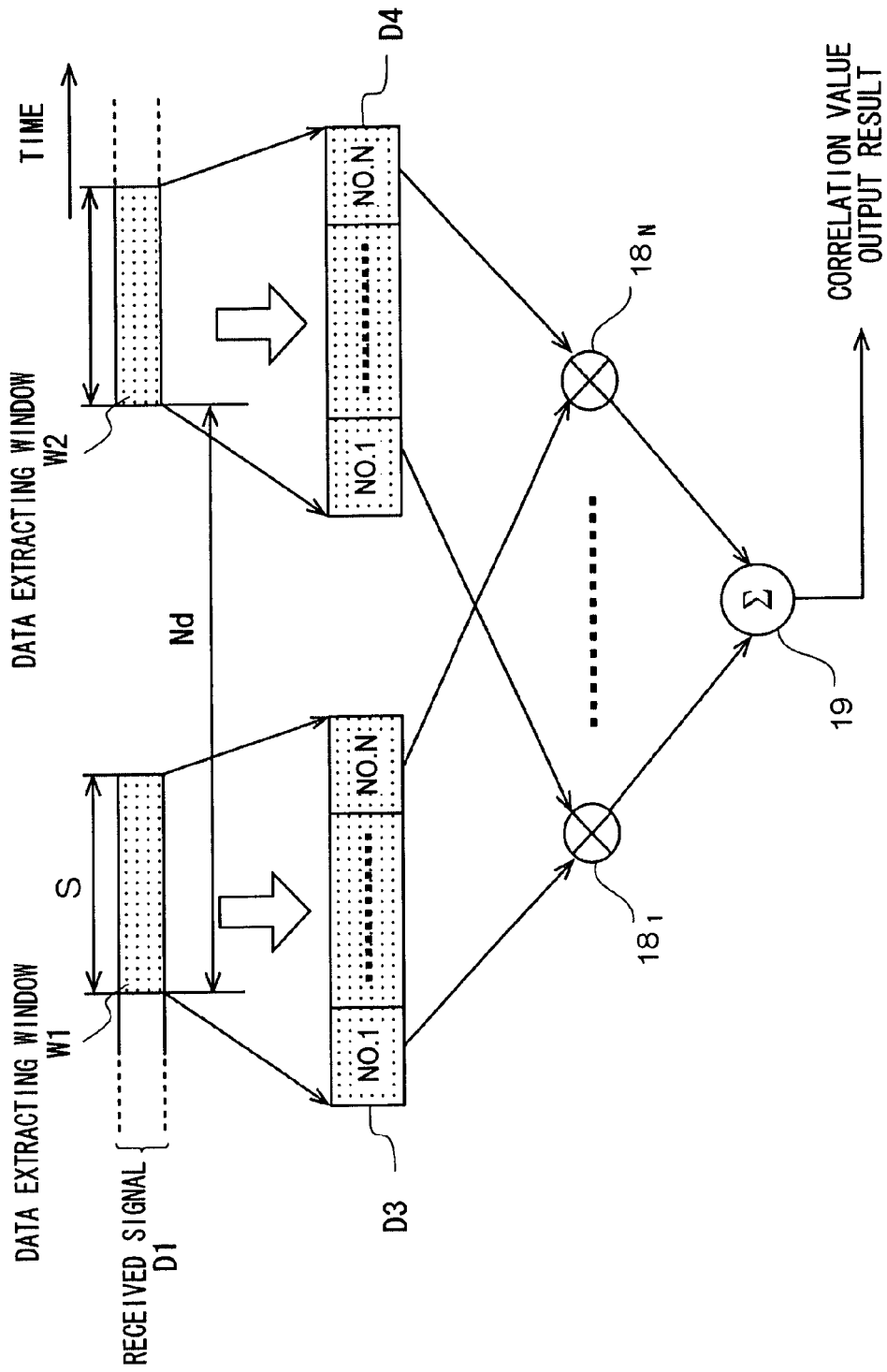

F I G. 10A
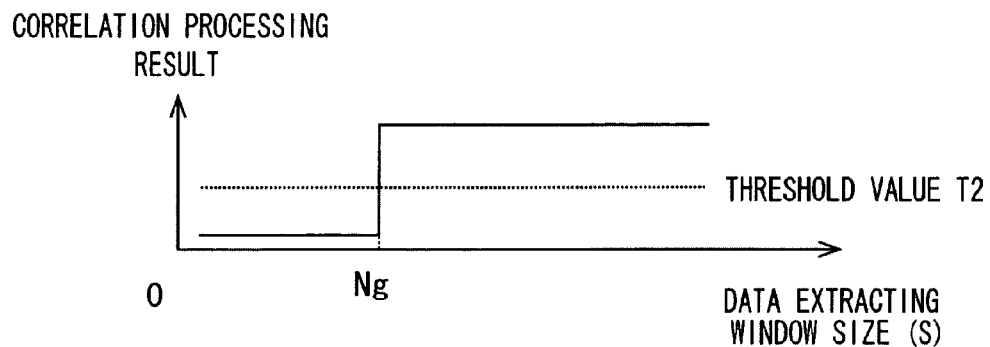
F I G. 10B
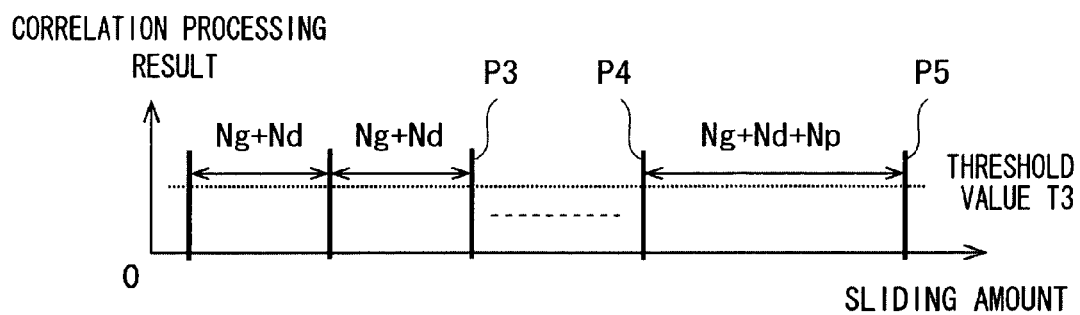
F I G. 10C
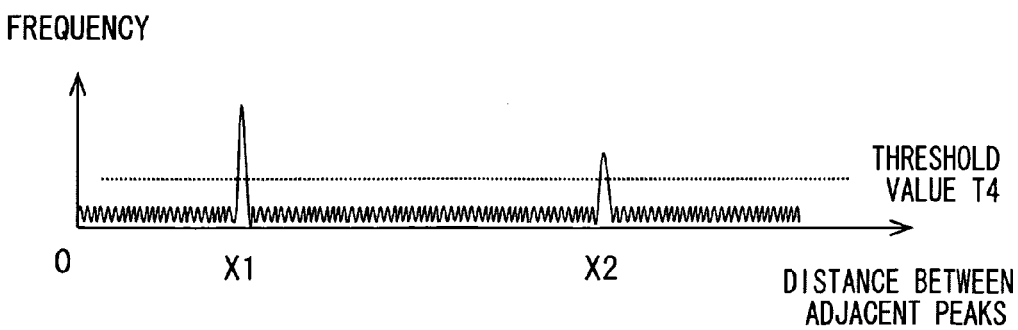

APPARATUS, METHOD, AND PROGRAM FOR DETECTING COMMUNICATION PARAMETER

BACKGROUND OF THE INVENTION

1. Field of the Invention

The present invention relates to an apparatus, a method, and a program for detecting a modulating parameter of a multiplex modulation system.

2. Description of the Related Art

There is an orthogonal frequency division multiplex (OFDM) signal as a type of multiplex modulating signals. The communication system using the OFDM signal uses a plurality of sub-carriers whose center frequencies are different from each other so that there provides a high frequency efficiency. In addition, it transmits transmission signals by multi-carrier signals thus exhibiting a property that is strong for interference. Therefore, the communication system using the OFDM signal has been actively applied to various kinds of communication systems such as radio LAN and the like (for example, Patent Document 1). As one of the radio LAN standard, it is a characteristic of the OFDM signal to have a structure in which a pilot symbol applied to synchronizing processing and a guard interval symbol for reducing the influence of multi-paths and for being applied to the synchronizing processing are added to an OFDM data symbol to be transmitted (Non-Patent Document 1).

FIG. 1A shows an example of the OFDM signal structure to which the present invention can be applied. As the basic structure of an OFDM signal frame, a pilot symbol aimed for synchronizing processing is arranged in the front and, following the pilot symbol, the type of communication signal and a plurality of OFDM data symbols as transmission data are arranged. In FIG. 1A, Np is the length of the pilot symbol, Ng is the length of the guard interval symbol, Nd is the length of the OFDM data symbol, and M is the number of the OFDM data symbols.

As shown in FIG. 1B, for synchronizing processing and in order to reduce the influence by multi-paths, a signal, which is a copy of a part of the OFDM data symbol to be transmitted, is added to the front of each OFDM data symbol as the guard interval symbol.

In conventional OFDM signal detection and demodulation processing, synchronizing and demodulation processing are performed on assumption that the length Np of the pilot symbol, the length Ng of the guard interval symbol, the length Nd of the OFDM data symbol, and the symbol number M of the OFDM data symbol per frame are known as information on a reception side.

In the OFDM communication system in which the modulating parameter is uniquely changed by a transmission side in accordance with the communication quality, it is important to detect the modulating parameter based on a received signal in the demodulation processing performed on the reception side. With this, data communication for informing a change of parameter becomes unnecessary and an increase in the data transmission capacity can be expected. Further, in a system for monitoring illegal radio waves, these parameters are generally unknown so that it is necessary to extract the parameter from the received signal.

As one of the conventional processing methods, there are two ways described in Non-Patent Document 2 in regards to synchronizing demodulation method under a condition that the above-described parameters are known. One is a method in which a PN-system pilot symbol is added to the front of an OFDM signal block and the principle of CDMA matched filter is used. From a result of the correlation value output (see Non-Patent Document 2, pp. 82-85), the method achieves frame synchronizing processing of the OFDM signal, and synchronizing and demodulation processing by detecting the phase error caused by radio wave propagation.

The other is synchronizing demodulation processing using the guard interval symbol. In this method, in a circuit shown in FIG. 2 (see Non-Patent Document 2, p. 57, FIG. 4.2, guard interval symbol type synchronizing circuit), two data windows for correlation processing, which have time delay difference for the length of the OFDM data symbol, are used for input signals, and synchronizing and demodulation processing are performed based on the correlation result. In FIG. 2, T is the OFDM block length without the guard interval symbol and Tg is the length of the guard interval symbol.

[Patent Document 1] Japanese Patent Unexamined Publication No. 2001-211137

[Non-Patent Document 1] IEEE Standard 802.11a-1999, p.12, 17.3.3 PLCP preamble (SYNC) FIG. 110-OFDM training structure

[Non-Patent Document 2] "OFDM System Technology and MATLAB Simulation Guide" by Ochi Hiroshi, pp. 53-71, published by TRICEPS, Inc., However, it is necessary in the first processing method disclosed in the above-described Non-Patent Document 2 to perform the correlation processing on assumption that the reception side knows the length and the system of the pilot symbol which is added to the transmission signal. Further, the second processing method disclosed in Non-Patent Document 2 achieves the effect of its action only when the length of the OFDM data symbol is known.

As describe above, the conventional OFDM modulation circuit is operable only under the condition where the modulating parameter of the OFDM signal is known and it does not properly operate when there is an input of signal whose modulating parameter of the OFDM signal is unknown.

SUMMARY OF THE INVENTION

The object of the present invention is to provide an apparatus, a method, and a program for detecting the modulating parameter of a multiple modulation system without known information.

In order to achieve the foregoing object, the communication parameter detecting apparatus according to the present invention comprises:

a correlation signal generating circuit which generates a duplicate signal for correlation processing based on a multiplex modulating signal;

an autocorrelation circuit which performs autocorrelation processing through carrying out sliding processing on the duplicate signal with respect to a received signal as the multiplex modulating signal;

an Nd detecting circuit which detects length of a data symbol of a multiplex modulating signal by detecting, from a correlation value output which is outputted by the autocorrelation processing, a correlation value peak obtained according to guard interval symbols which are identical signal components present in the received signal;

a window generating circuit for generating a pair of data extracting windows for correlation processing, the windows having different window sizes and a space therebetween which corresponds to the detected length of the data symbol;

a data correlation circuit which performs correlation processing mutually on extracted data which are extracted through the data extracting windows through the sliding processing by changing the window sizes;

an Ng detecting circuit which detects length of the guard interval symbol of the multiplex modulating signal by detecting a correlation value peak which is obtained when the length of the guard interval symbol and the window size become consistent based on the correlation processing performed mutually on the extracted data;

an Np detecting circuit which detects length of a pilot symbol of the multiplex modulating signal by obtaining periodicities of the correlation value peaks based on a result of the correlation processing of data which are extracted through the data extracting windows of different sizes and distance information of the adjacent correlation value peaks with different periodicities under a condition where the space between the pair of data extracting windows is the length of the data symbol; and an M detecting circuit which detects a number of data symbols of the multiplex modulating signal per frame by obtaining frame length of the multiplex modulating signal according to the detected lengths of the data symbol, the guard interval symbol, and the pilot symbol, and by referring to each of the symbol lengths as communication parameters.

In the case of the multiplex modulating signal, a plurality of data symbols are contained within a basic frame. The data symbols functions as the type of communication signal and transmission data, and a guard interval symbol which is a copy of a part of the data symbol is added to the front of each data symbol.

The present invention pays attention to the fact that there is the guard interval symbol added to the front of the data symbol within the basic frame, and detects the length of the data symbol at first. That is, when a multiplex modulating signal is inputted as a receiving signal, a duplicate signal is generated as a signal for correlation processing based on the multiplex modulating signal. Then, by sliding the generated duplicate signal in the time base direction with respect to the multiplex modulating signal so as to perform autocorrelation processing on the multiplex modulating signal and the duplicate signal. Subsequently, the length of the data symbol of the multiplex modulating signal is detected by detecting, from a correlation value output which is outputted by the autocorrelation processing, a correlation value peak obtained according to guard interval symbols which are identical signal components present in the received signal.

The duplicate signal which is autocorrelation-processed with the multiplex modulating signal is a duplication of the multiplex modulating signal. Thus, at the time of performing correlation processing through carrying out the sliding processing on the duplicate signal with respect to the multiplex modulating signal, there generates a large correlation value peak when the guard interval symbol of the multiplex modulating signal and that of the duplicate signal are consistent. In this case, there is a guard interval symbol added to the front of the data symbol of the multiplex modulating signal so that the distance between large correlation value peaks adjacent to each other corresponds to the length of the data symbol of the multiplex modulating signal. Thus, the data length of the data symbol of the multiplex duplication signal is detected by detecting, from a result of the autocorrelation processing, the correlation value peaks which can be obtained when the guard interval symbol present in the multiplex modulating signal and the guard interval symbol of the duplicate signal, which is the same signal component as the guard interval symbol of the multiplex duplication signal, are consistent.

Then, based on the detected length of the data symbol, the length of the guard interval symbol of the multiplex modulating signal is detected. That is, there are generated a pair of data extracting windows for correlation processing, in which the windows have different window sizes and a space therebetween which corresponds to the detected length of the data symbol. Correlation processing is performed mutually on the extracted data which are extracted through the data extracting windows through carrying out the sliding processing by changing the window sizes. The distance between the data extracting windows corresponds to the length of the data symbol. Therefore, there generates a large correlation value peak when the data extracted through the data extracting windows and the guard interval symbol of the multiplex modulating signal are consistent. Thus, the length of the guard interval symbol of the multiplex modulating signal is detected by detecting the correlation value peak which is obtained when the length of the guard interval symbol becomes consistent with the window size based on the correlation processing performed mutually on the extracted data.

Under the condition where the distance between the pair of data extracting windows is the length of the data symbol, there generates a large correlation value peak with the correlation processing performed mutually on the extracted data which are extracted through the data extracting windows, when the size of the data extracting window and the length of the guard interval symbol are consistent and when the size of the extracting window exceeds the length of the guard interval symbol, respectively. Therefore, the length of the pilot symbol of the multiplex modulating signal is detected by obtaining the periodicities of the correlation value peaks based on the result of the correlation processing of the data which are extracted through the data extracting windows having different sizes and obtaining the distance information between the adjacent correlation value peaks with different periodicities.

Then, the number of data symbols per frame of the multiplex modulating signal is detected by obtaining the frame length of the multiplex modulating signal based on the detected lengths of the data symbol, the guard interval symbol, and the pilot symbol, and by referring to each of the symbol lengths as communication parameters.

In the description provided above, described is the case of detecting the communication parameter from the multiplex modulating signal which has the signal structure wherein the signal that is a copy of a part of the data symbol is added to the front of the data symbol as the guard interval symbol and the pilot symbol is added in front of the guard interval symbol. However, it is not limited to this.

That is, in the case of the multiplex modulating signal with the signal structure wherein the signal that is a copy of a part of the data symbol is added to the front of the data symbol as the guard interval symbol, the pilot symbol may be inserted within the data symbol. In that case, the pilot symbol cannot function as the pilot signal. In that condition, processing may be performed for detecting, as the communication parameters, only the length Nd of the data symbol and the length Ng of the guard interval symbol in the multiplex modulating signal.

There has been described by referring to the case where the present invention is built as an apparatus. However, it is not limited to this. The present invention may be built as a method.

The communication parameter detecting method according to the present invention which is built on the basis of the above-described concepts comprises:

an autocorrelation step of performing autocorrelation processing through carrying out sliding processing on a duplicate signal, which is generated based on a multiplex duplicate signal, with respect to a received signal as the multiplex modulating signal;

an Nd detecting step of detecting length of a data symbol of a multiplex modulating signal by detecting, from a correlation value output which is outputted by the autocorrelation processing, a correlation value peak obtained according to guard interval symbols which are identical signal components present in the received signal;

a data correlation step of performing correlation processing mutually on extracted data which are extracted through a pair of data extracting windows through the sliding processing by changing the window sizes, in which the windows have different window sizes and a space therebetween which corresponds to the detected length of the data symbol;

an Ng detecting step of detecting length of the guard interval symbol of the received signal by detecting a correlation value based on the correlation processing performed mutually on the extracted data;

an Np detecting step of detecting length of a pilot symbol of the multiplex modulating signal by obtaining periodicities of the correlation value peaks based on a result of the correlation processing of data which are extracted through the data extracting windows of different sizes and distance information of the adjacent correlation value peaks with different periodicities under a condition where the space between the pair of data extracting windows is the length of the data symbol; and an M detecting step of detecting a number of data symbols of the multiplex modulating signal per frame by obtaining frame length of the multiplex modulating signal according to the detected lengths of the data symbol, the guard interval symbol, and the pilot symbol, and by referring to each of the symbol lengths as the communication parameters.

As described above, the communication parameter detecting method according to the present invention enables to obtain, without prior information, the communication parameters, i.e. the lengths of each of the pilot symbol, guard interval symbol, and data symbol, and the number of data symbols of the multiplex modulating signal per frame.

In the description provided above, described is the case of detecting the communication parameter from the multiplex modulating signal which has the signal structure wherein the signal that is a copy of a part of the data symbol is added to the front of the data symbol as the guard interval symbol and the pilot symbol is added in front of the guard interval symbol. However, it is not limited to this.

That is, in the case of the multiplex modulating signal with the signal structure wherein the signal that is a copy of a part of the data symbol is added to the front of the data symbol as the guard interval symbol, the pilot symbol may be inserted within the data symbol. In that case, the pilot symbol cannot function as the pilot signal. In that condition, processing may be performed for detecting, as the communication parameters, only the length Nd of the data symbol and the length Ng of the guard interval symbol in the multiplex modulating signal.

The above-described communication parameter detecting apparatus according to the present invention is built as a hardware apparatus. However, it is not limited to this. The present invention may be achieved by installing a program to a computer so that the computer executes the program for achieving the functions of the communication parameter detecting apparatus.

The communication parameter detecting program according to the present invention, which is built on the basis of the above-described concepts, is for a computer which is used for detecting a modulating parameter of an orthogonal frequency division multiplex signal. The program executes, by the computer:

a function of generating a duplicate signal for correlation processing based on a multiplex modulating signal;

a function of performing autocorrelation processing through carrying out sliding processing on the duplicate signal with respect to a received signal as the multiplex modulating signal;

a function of detecting length of a data symbol of a multiplex modulating signal by detecting, from a correlation value output which is outputted by the autocorrelation processing, a correlation value peak obtained according to guard interval symbols which are identical signal components present in the received signal;

a function of generating a pair of data extracting windows for correlation processing, the windows having different window sizes and a space therebetween which corresponds to the detected length of the data symbol;

a function of performing correlation processing mutually on extracted data which are extracted through the data extracting windows through the sliding processing by changing the window sizes;

a function of detecting length of the guard interval symbol of the multiplex modulating signal by detecting a correlation value peak which is obtained when the length of the guard interval and the window size become consistent in the correlation processing performed mutually on the extracted data;

a function of detecting length of a pilot symbol of the multiplex modulating signal by obtaining periodicities of the correlation value peaks based on a result of the correlation processing of data which are extracted through the data extracting windows of different sizes and distance information of the adjacent correlation value peaks with different periodicities under a condition where the space between the pair of data extracting windows is the length of the data symbol; and a function of detecting a number of data symbols of the multiplex modulating signal per frame by detecting frame length of the multiplex modulating signal according to the detected lengths of the data symbol, the guard interval symbol, and the pilot symbol, and by referring to communication parameters.

In the description provided above, described is the case of detecting the communication parameter from the multiplex modulating signal which has the signal structure wherein the signal that is a copy of a part of the data symbol is added to the front of the data symbol as the guard interval symbol and the pilot symbol is added in front of the guard interval symbol. However, it is not limited to this.

That is, in the case of the multiplex modulating signal with the signal structure wherein the signal that is a copy of a part of the data symbol is added to the front of the data symbol as the guard interval symbol, the pilot symbol may be inserted within the data symbol. In that case, the pilot symbol cannot function as the pilot signal. In that condition, processing may be performed for detecting, as the communication parameters, only the length Nd of the data symbol and the length Ng of the guard interval symbol in the multiplex modulating signal.

As described above, with the present invention, it is possible to detect, without known information, the lengths of each of the pilot symbol, guard interval symbol, and data symbol, and the number of data symbols of the multiplex modulating signal per frame, which are the modulating parameters (communication parameters) of the multiples modulating signal. That is, first of all, the length of the data symbol is detected by the correlation processing by utilizing the periodicities of the guard interval symbols which are in the signal structure of the multiplex modulating signal. Base on the detected result, extraction of specific data, correlation processing, detection of correlation peak, and detection of the periodicities can be performed. Thereby, it is possible to detect, through blind processing, the lengths of each of the guide interval symbols, pilot symbol, and the data symbol, and the number of data symbols of the multiplex modulating signal per frame without prior information.

BRIEF DESCRIPTION OF THE DRAWINGS

FIG. 1A is an illustration for describing an example of a frame structure of an orthogonal frequency division multiplex signal, and FIG. 1B is an illustration for describing a guard interval symbol;

FIG. 9 is an illustration for describing the case where, in FIG. 4, the correlation processing is performed by using data extracting windows having N kinds of window sizes;

FIG. 10A is a characteristic diagram for showing a result of correlation processing using the data extracting windows of FIG. 7 as the parameter, FIG. 10B is a characteristic diagram for showing the periodicity of the correlation peak when the window size of FIG. 7 is consistent with the length of the guard interval symbol, and FIG. 10C is a characteristic diagram for showing a frequency histogram of the correlation peak period which is obtained by the correlation peak detecting processing of FIG. 4;

DETAILED DESCRIPTION OF THE PREFERRED EMBODIMENTS

Now, preferred embodiments of the present invention will be described in detail by referring to the accompanying drawings. As the basic structure, the embodiments of the present invention are characterized to comprise a function of detecting a modulating parameter (communication parameter) of a multiplex modulating signal without known information. In the embodiments of the present invention, there are described the cases of orthogonal frequency division multiplex signals (referred to as OFDM signals hereinafter) shown in FIG. 1A and FIG. 1B as the multiplex modulating signals.

First Embodiment

Figure 2:
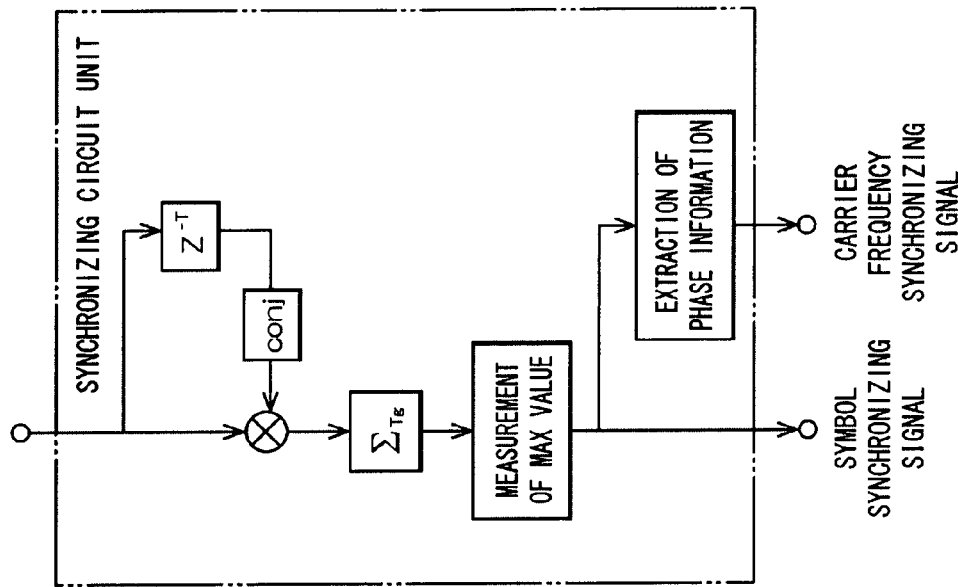
FIG. 2 is a block diagram for showing conventional synchronizing processing using the guard interval symbol.
Figure 3:
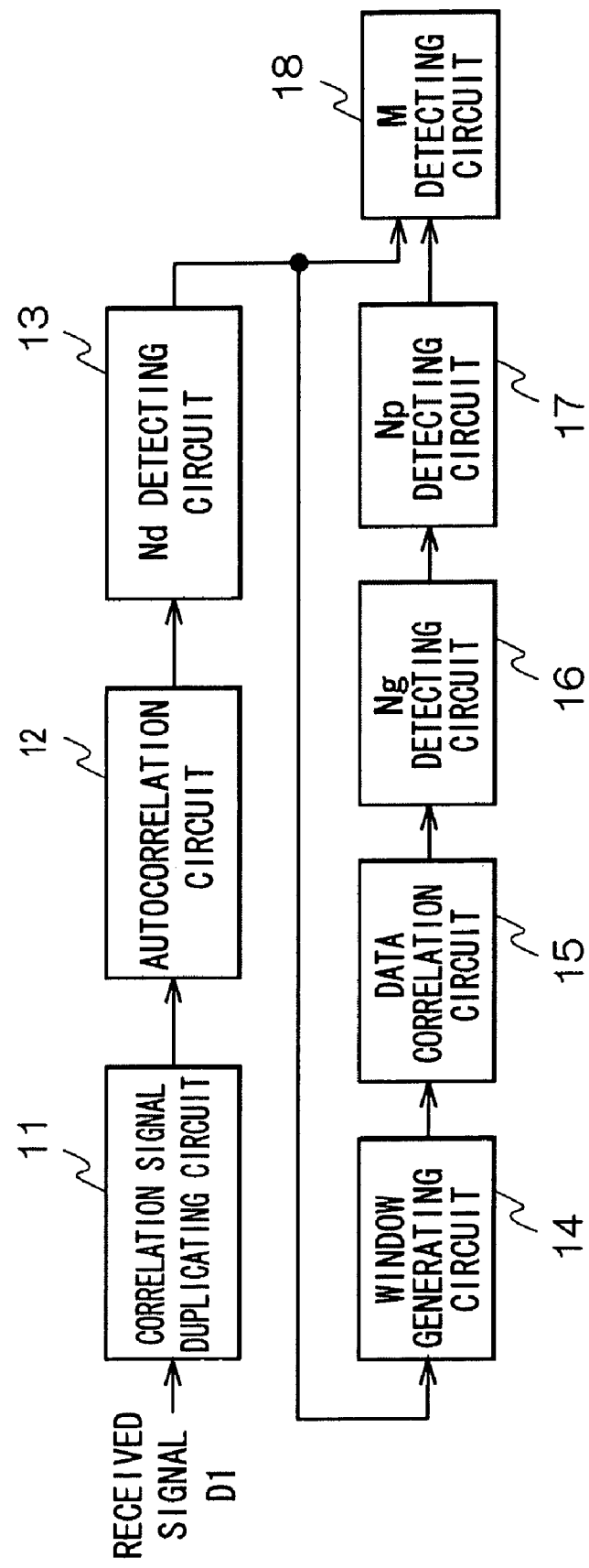
FIG. 3 is a functional block diagram for showing a modulating parameter detecting apparatus of an orthogonal frequency division multiplex signal according to an embodiment of the present invention.

As shown in FIG. 3, a modulating parameter detecting apparatus (communication parameter detecting apparatus) 10 for the orthogonal frequency division multiplex signals according to the embodiment of the present invention comprises a correlation signal generating circuit 11, an autocorrelation circuit 12, an Nd detecting circuit 13, a window generating circuit 14, a data correlation circuit 15, an Ng detecting circuit 16, an Np detecting circuit 17, and an M detecting circuit 18.

Figure 5:
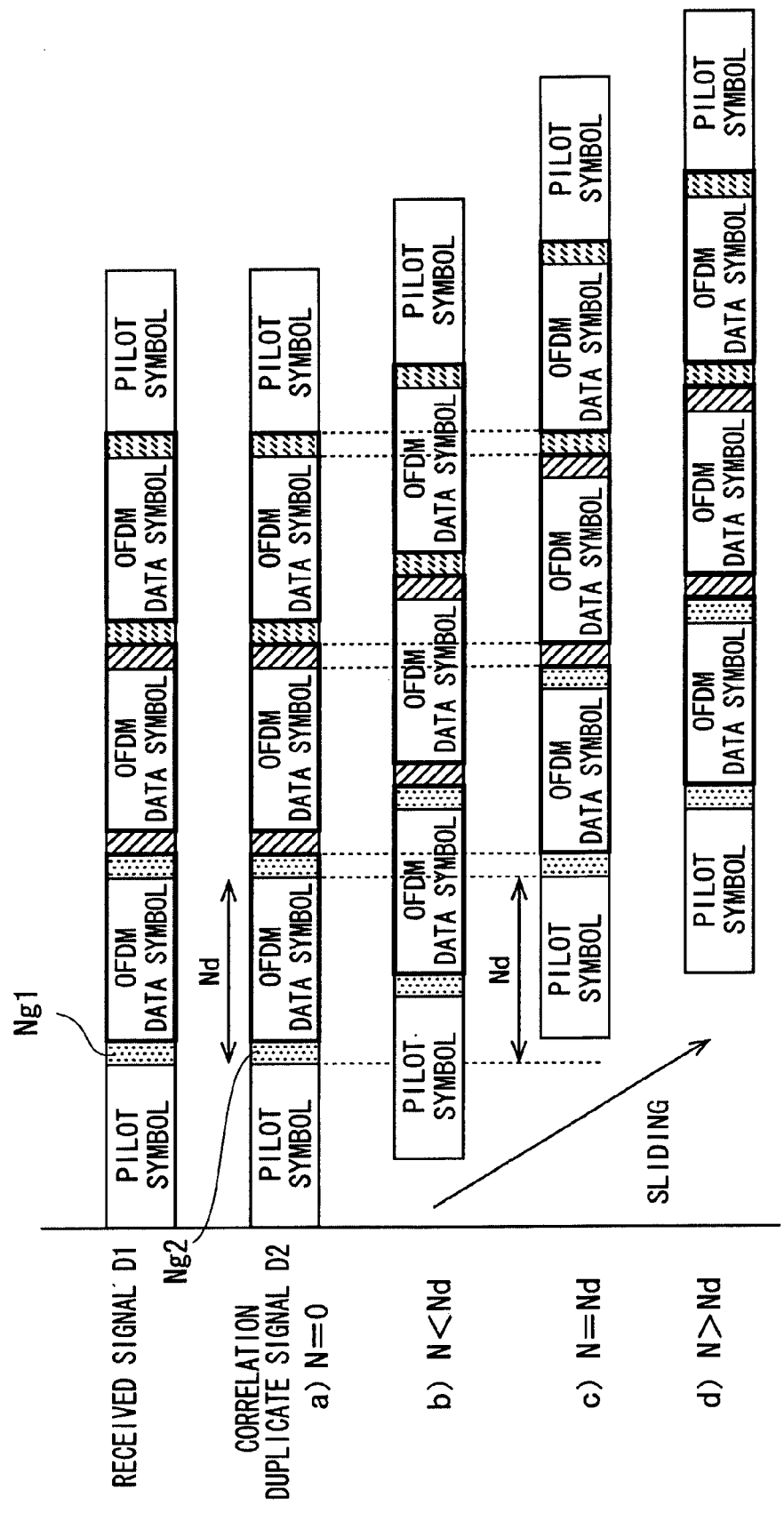
FIG. 5 is an illustration for describing sliding processing 102 and correlation processing 103 of FIG. 4.

The correlation signal generating circuit 11 generates correlation duplicate signal 2 based on a received OFDM signal (received signal) D1. As shown in FIG. 5, the autocorrelation circuit 12 performs autocorrelation processing by carrying out sliding processing of the correlation duplicate signal D2 generated by the correlation signal generating circuit 11 in the time base direction with respect to the received signal D1. The autocorrelation circuit 12 has a function of variably and appropriately setting the data sliding amount (N) which is the amount of sliding the correlation duplicate signal. The initial value of the sliding amount (N) set in the autocorrelation circuit 12 is 0. As the characteristic of the OFDM signal, as shown in FIG. 1A and FIG. 1B, a signal which is a copy of a part (especially the end) of a data symbol is added to the front of the data symbol of the OFDM signal as a guard interval symbol. Thus, when the autocorrelation circuit 12 performs the sliding processing of the duplicate signal D2 with respect to the received signal D1, correlation of the guard interval symbol of the received signal D1 and the guard interval symbol of the duplicate signal D2 is performed.

In case where the autocorrelation circuit 12 performs sliding processing of the duplicate signal D2 with respect to the received signal D1, when the sliding amount N is N<Nd as in b) of FIG. 5, guard interval symbol Ng1 of the received signal D1 and guard interval symbol Ng2 of the duplicate signal D2 are not consistent with each other. Thus, a large correlation value peak cannot be obtained. When the sliding amount N by the autocorrelation circuit 12 is N=Nd as in c) of FIG. 5, the guard interval symbol Ng1 of the received signal D1 and the guard interval symbol Ng2 of the duplicate signal D2 are consistent with each other. Thus, a large correlation value peak can be obtained. When the sliding amount N by the autocorrelation circuit 12 is N>Nd as in d) of FIG. 5, the guard interval symbol Ng1 of the received signal D1 and the guard interval symbol Ng2 of the duplicate signal D2 are not consistent with each other. Thus, a large correlation value peak cannot be obtained.

The Nd detecting circuit 13 pays attention to the correlation value peak which is outputted as a result of correlation processing when the autocorrelation circuit 12 performs the autocorrelation processing by carrying out the sliding processing of the duplicate signal D2 with respect to the received signal D1. From the correlation output which is outputted by the autocorrelation processing performed by the autocorrelation circuit 12, the Nd detecting circuit 13 detects the correlation value peak which is obtained from the guard interval symbol s as the same signal components present within the received signal D1 so as to detect the length Nd of the data symbol (OFDM data symbol) in the OFDM signal.

Figure 6:
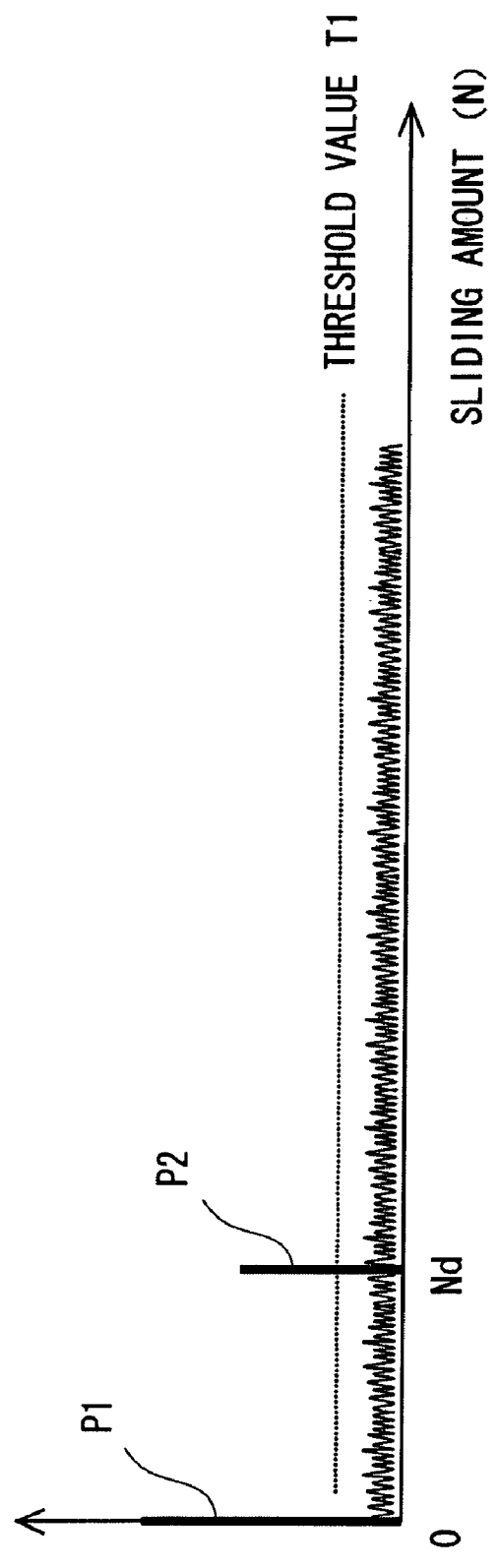
FIG. 6 is an illustration for describing correlation peak detecting processing 104 of FIG. 4.

There is provided a specific description of a function of the Nd detecting circuit 13 for detecting the data length Nd of the OFDM data symbol. When the sliding amount N by the autocorrelation circuit 12 for performing autocorrelation of the received signal D1 and the duplicate signal D2 is N=0 as in a) of FIG. 5, the guard interval symbol Ng1 of the received signal D1 and the guard interval symbol Ng2 of the duplicate signal D2 are consistent with each other. Thus, as shown in FIG. 6, a large correlation value peak P1 can be obtained. When the autocorrelation circuit 12 performs the autocorrelation processing by carrying out the sliding processing of the duplicate signal D2 with respect to the received signal D1 with the sliding amount N=Nd as in c) of the FIG. 5, the guard interval symbol Ng1 of the received signal D1 and the guard interval symbol Ng2 of the duplicate signal D2 are consistent with each other. Thus, as shown in FIG. 6, a large correlation value peak P2 can be obtained. The guard interval symbol is added to the front of the OFDM signal so that the distance between the correlation value peak P1 which is outputted when the sliding amount N=0 and the correlation value peak P2 which is outputted when the sliding amount N=Nd correspond to the length Nd of the OFDM data symbol of the OFDM signal.

Thus, the Nd detecting circuit 13 monitors the output state of the correlation value peak P1 which is obtained by the correlation processing of the guard interval symbol Ng1 of the received signal D1 and the guard interval symbol Ng2 of the duplicate signal D2 when the autocorrelation circuit 12 performs the sliding processing with the sliding amount N=0, and stores and saves the data. Since the autocorrelation circuit 12 performs the correlation processing by changing the sliding amount N, the Nd detecting circuit 13 then monitors whether or not the correlation value peak is outputted, and detects the correlation value peaks P1, P2 shown in FIG. 6, which are obtained from the guard interval symbols as the same signal components present in the received signal D1. Thereby, the length Nd of the data symbol of the OFDM can be detected.

Further, as shown in FIG. 6, the Nd detecting circuit 13 detects the correlation value peaks P1, P2 using a threshold value T1 which can be set variably. Detection of the correlation value peaks P1, P2 by using the threshold value T1 is advantageous in respect that it can improve the accuracy of detecting the length Nd of the OFDM data symbol by the Nd detecting circuit 13.

Figure 7A:
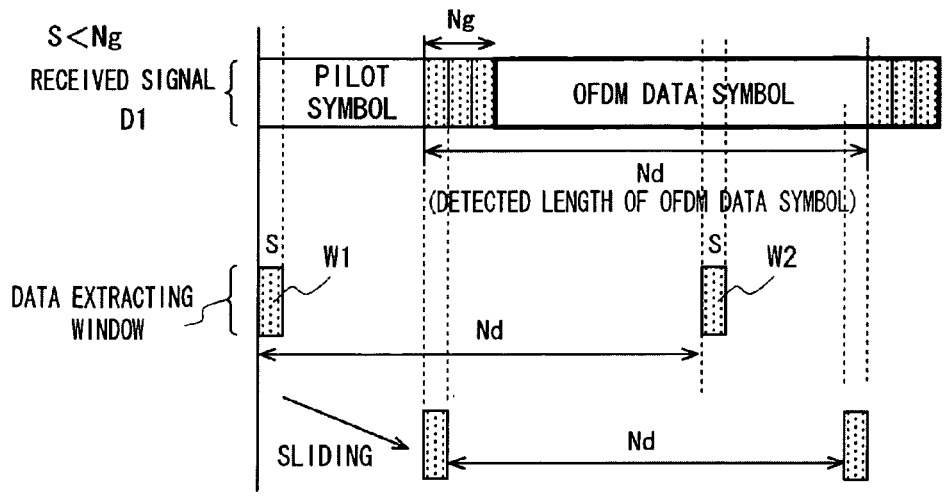
FIG. 7 is an illustration for describing sliding processing 106 and correlation processing 107 of FIG. 4.
Figure 7B:
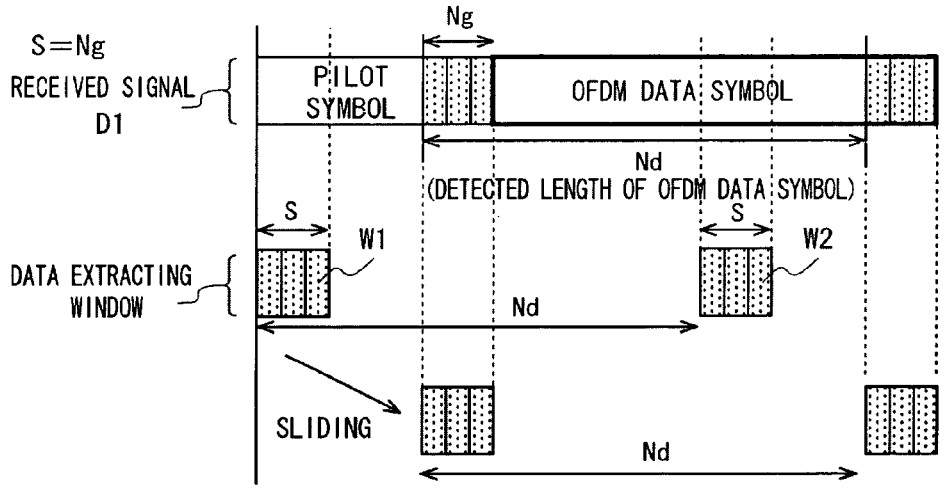
Figure 8:
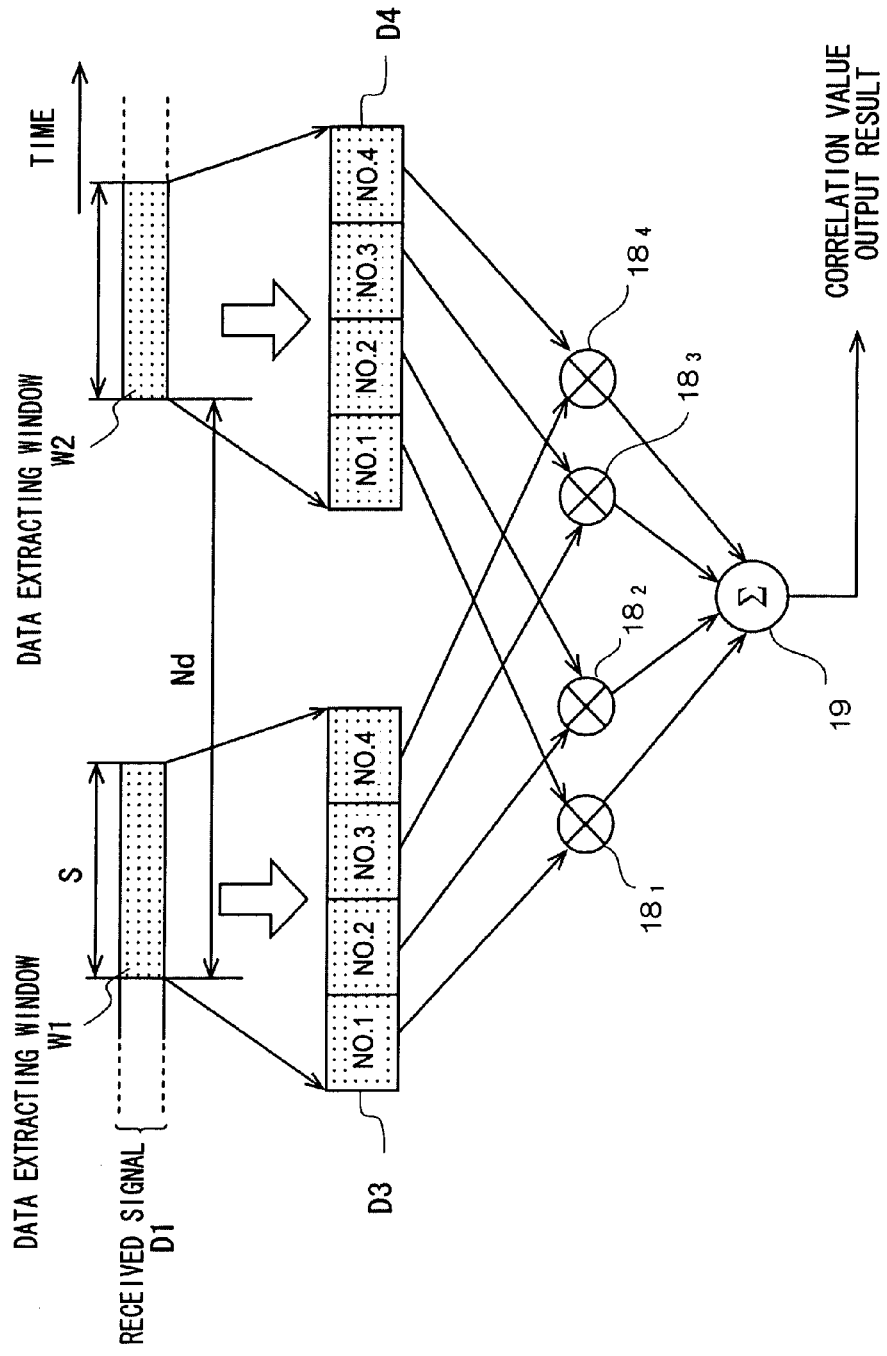
FIG. 8 is an illustration for describing the case where, in FIG. 4, the correlation processing is performed by using data extracting windows having three kinds of window sizes.

The window generating circuit 14 obtains information on the length Nd of the OFDM data symbol which is detected by the Nd detecting circuit 13, and generates a pair of data extracting windows W1, W2 for correlation processing with a space therebetween that corresponds to the length Nd of the OFDM data symbol as shown in FIG. 8. As shown in FIG. 7A-FIG. 7B, the window generating circuit 14 has a function of generating the data extracting windows W1, W2 with different window sizes S. The window generating circuit 14 changes the sizes of the two data extracting windows W1 and W2 simultaneously.

The data correlation circuit 15 has a function of performing correlation processing by carrying out the sliding processing mutually on extracted data W3, W4 (see FIG. 8) which are extracted through the data extracting windows W1, W2 by changing the window sizes S.

Next, a function of the data correlation circuit 15 will be described in detail by referring to the case where the window generating circuit 14 generates the data extracting windows W1, W2 with three kinds of window sizes S.

Upon receiving information on the generated data extracting windows W1, W2 from the window generating circuit 14, the data correlation circuit 15 performs sliding processing in the time base direction with respect to the received signal D1 by changing the sizes S of the data extracting windows W1, W2. By the sliding processing, the data correlation circuit 15 extracts a specific part of the data from the received signal D1 through the data extracting windows W1, W2, and performs mutual correlation processing of the extracted data D3 and D4.

Figure 7C:
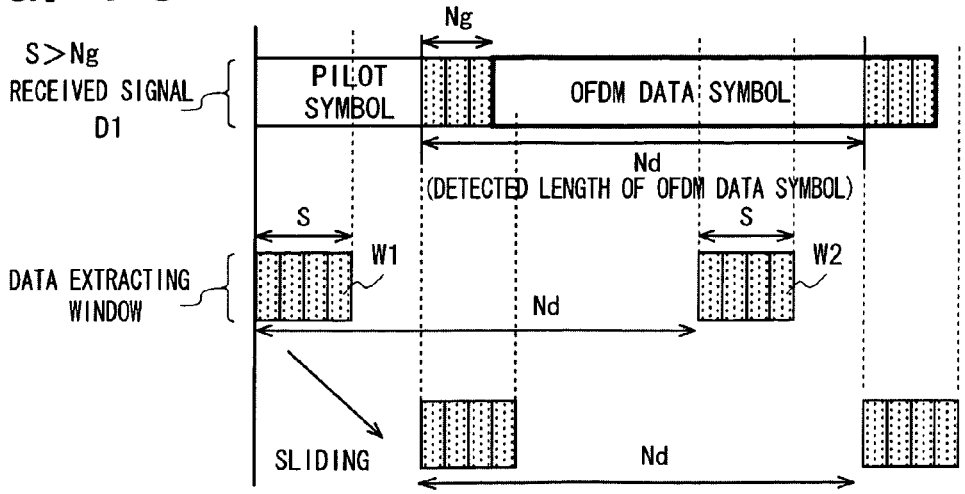

There is provided a specific description of the case where the data correlation circuit 15 performs mutual correlation processing on the extracted data W3, W4 which are extracted through the data extracting windows W1, W2. The data correlation circuit 15 performs sliding processing on the data extracting windows W1, W2 with respect to the received signal D1 as shown in FIG. 7A-FIG. 7C so as to extract a specific part of the data W3, W4 from the received signal D1 by the sliding processing as shown in FIG. 8. Then, the data correlation circuit 15 divides the extracted data W3, W4 which are extracted through the data extracting windows W1, W2 having, therebetween, the distance of the length Nd of the OFDM data symbol, into four, and inputs the data corresponding to each other to correlation devices $18_1$-$18_4$. That is, No. 1 data in one of the extracted data W3 and No. 1 data in the other extracted data W4 are inputted to the correlation device $18_1$, No. 2 data in the extracted data W3 and No. 2 data in the extracted data W4 to the correlation device $18_2$, No. 3 data in the extracted data W3 and No. 3 data in the extracted data W4 to the correlation device $18_3$, and No. 4 data in the extracted data W3 and No. 4 data in the extracted data W4 to the correlation device $18_4$, respectively, for performing the correlation processing on the data. Then, the data correlation circuit 15 inputs, to an adder 19, the information of the correlation result outputted from a plurality of the correlation devices $18_1$-$18_4$ for adding the output values thereof. The window sizes S generated by the window generating circuit 14 are not limited to three kinds but may be variably set as appropriate. Further, for the correlation processing by the data correlation circuit 15, it is not limited to the case where the data correlation circuit 15 performs the correlation processing on the extracted data W3, W4 by changing the three types of window sizes S. When there are N types of window sizes S, it is to have a structure in which correlation devices $18_1$-$18_n$ are combined with the adder 19 as shown in FIG. 9.

Here, the sizes S of the data extracting windows W1, W2 outputted from the window generating circuit 14 are set as the initial value. First, described is the case where the initial sizes S of the data extracting windows W1, W2 are smaller than the length Ng of the guard interval symbol which is added to the front of the OFDM data symbol. In this case, as shown n FIG. 7A, the sizes S of the data extracting windows W1, W2 generated by the window generating circuit 14 are smaller than the length Ng of the guard interval symbol (S<Ng). Thus, a large correlation value peak cannot be obtained when performing mutual correlation processing on the extracted data W3, W4 which are extracted through the data extracting windows W1, W2.

Next, there is described the case where the sizes S of the data extracting windows W1, W2 outputted by the window generating circuit 14 are consistent with the length Ng of the guard interval symbol which is added to the front of the OFDM data symbol. In this case, as shown in FIG. 7B, the sizes S of the data extracting windows W1, W2 generated by the window generating circuit 14 are consistent with the length Ng of the guard interval symbol (S=Ng). Thus, a large correlation value peak can be obtained when performing mutual correlation processing on the extracted data W3, W4 which are extracted through the data extracting windows W1, W2.

Subsequently, there is described the case where the seizes S of the data extracting windows W1, W2 outputted by the window generating circuit 14 are larger than the length Ng of the guard interval symbol which is added to the front of the OFDM symbol. In this case, as shown in FIG. 7C, the sizes S of the data extracting windows W1, W2 generated by the window generating circuit 14 are larger than the length Ng of the guard interval symbol (S>Ng). Thus, a large correlation value peak can be obtained as well when performing mutual correlation processing on the extracted data W3, W4 which are extracted through the data extracting windows W1, W2.

As shown in FIG. 8, the distance between the data extracting windows W1 and W2 is set as the length from the front of one of the data extracting window W1 to the front of the other data extracting window W2. Therefore, when the mutual correlation processing is performed on the data W3, W4 extracted through the data extracting windows W1, W2 with the sizes S which are the same or larger than the length Ng (S=Ng, S>Ng), a large correlation value peak can be obtained, respectively.

As described above, based on the correlation processing outputted from the data correlation circuit 15, the Ng detecting circuit 16 detects the correlation value peak which is obtained when the sizes S of the data extracting windows W1, W2 are consistent with the length Ng of the guard interval symbol. Thereby, the length Ng of the guard interval symbol in the orthogonal frequency division multiplex signal is detected.

As shown in FIG. 10A, the correlation value peak is not outputted before the sizes S of the data extracting windows W1, W2 become consistent with the length Ng of the guard interval symbol (S<Ng). Thus, the result of the correlation processing is smaller than a threshold value T2. When the sizes S of the data extracting windows W1, W2 become consistent with the length Ng of the guard interval symbol (S=Ng), there is a large correlation value peak observed and, in addition, the peak value exceeds the threshold value T2. Also, in the case where the sizes S of the data extracting windows W1, W2 are changed to the size larger than the length Ng of the guard interval symbol, the correlation value peak exceeding the threshold value T2 is continuously observed.

Thus, as shown in FIG. 10A, the Ng detecting circuit 16 detects the correlation value based on the mutual correlation processing of the extracted data W3, W4 by using the threshold value T2 which can be set variably. Detection of the correlation value by setting the threshold value is advantageous in respect that it enables to improve the accuracy of detecting the length Ng of the guard interval symbol.

The Ng detecting circuit 17 has a function of detecting the length Np of a pilot symbol of the OFDM signal through obtaining periodicities of the correlation value peaks and the distance information between the adjacent correlation value peaks with different periodicities based on the correlation processing result of the data which are extracted through the data extracting windows W1, W2 in the different window sizes S, under the condition where the space between the pair of the data extracting windows W1, W2 is the detected length Nd of the OFDM data symbol.

The function of the Np detecting circuit 17 will be described in detail. The Np detecting circuit 17 performs detecting processing by paying attention to the length Ng of the guard interval symbol obtained by the Ng detecting circuit 16 and the result of the correlation processing performed when the sizes of the data extracting window W1, W2 are the length Ng of the guard interval symbol. Under the condition where the sizes of the data extracting windows W1, W2 are the length Ng of the guard interval symbol, there are two periodicities generated in the correlation value peaks as shown in FIG. 10B.

Between the two periodicities, as shown in FIG. 10B, one of the periods has the length between the adjacent correlation value peaks P2 and P3, which is a period (Ng+Nd) consistent with the sum of the length Ng of the guard interval symbol and the length Nd of the OFDM data symbol. As shown in FIG. 10B, the other period has the length between the adjacent correlation value peaks P3 and P4, which is a period consistent with the sum of the length Ng of the guard interval symbol, the length Nd of the OFDM data symbol, and the length Np of the pilot symbol (Ng+Nd+Np). The reason for including the length Np of the pilot symbol is as follows. It is because the correlation value peak P4 appears by corresponding to the position of the guard interval symbol following the pilot symbol at the end of the OFDM signal frame shown in FIG. 1 when the sizes S of the data extracting windows W1, W2 are larger than the length Ng of the guard interval symbol.

The Np detecting circuit 17 detects the above-described two periodicities by obtaining the information regarding the sizes S of the data extracting windows W1, W2 generated by the window generating circuit 14 (i.e. the size information indicating that the sizes S of the data extracting windows W1, W2 are consistent with the length Ng of the guard interval symbol and the size information indicating that the sizes S of the data extracting windows W1, W2 exceed the length Ng of the guard interval symbol) and the information on the correlation value peak which is obtained when the data extracting windows W1, W2 and the length Ng of the guard interval symbol are consistent.

That is, the Np detecting circuit 17 detects the periodicity having the length of Ng+Nd based on the size information indicating that the sizes S of the data extracting windows W1, W2 are consistent with the length Ng of the guard interval symbol and the information of the correlation value peak which is obtained when the data extracting windows W1, W2 and the length Ng of the guard interval symbol are consistent. Further, the Np detecting circuit 17 detects the periodicity having the length of Ng+Nd+Np based on the size information indicating that the sizes S of the data extracting windows W1, W2 exceed the length Ng of the guard interval symbol and the information of the correlation value peak which is obtained when the data extracting windows W1, W2 and the length Ng of the guard interval symbol are consistent.

Furthermore, as shown in FIG. 10B, by using a threshold value T3 which can be set variably for the correlation value peaks P3, P4, P5 in the two detected periodicities, the Np detecting circuit 17 detects the correlation value peaks P3, P4, P5 whose values exceed the threshold value T3. Among the detected correlation value peaks, the Np detecting circuit 17 makes a frequency histogram based on the distance (sliding amount) between the adjacent correlation value peaks P4, P5 which exceed a threshold value 4. FIG. 10C shows an example of the frequency histogram.

In FIG. 10C, a first correlation value peak X1 corresponds to the correlation value peak P4 (FIG. 10B) which is generated by the period of Ng+Nd, while a second correlation value peak X2 corresponds to the correlation value peak P5 (FIG. 10C) which is generated by the period of Ng+Nd+Np.

The Np detecting circuit 17 measures the sliding amount from the correlation value peak 3 of the period of Ng+Nd as the reference to the correlation value peak P4 and the sliding amount from the reference to the correlation value peak P5 so as to obtain the distance information between the correlation value peaks P3 and P4 which have different periodicities. The distance information between the adjacent correlation value peaks P3 and P4 corresponds to the second correlation value peak X2, which corresponds to the length of the period Ng+Nd+Np.

After obtaining the above-described information, the Np detecting circuit 17 detects the length Np of the pilot symbol by the following expression (1) by using the distance information and the length Ng of the guide interval symbol and the length Nd of the OFDM data symbol which have been detected so far among the parameters of the OFDM signal.

$$Np=X2-(Ng+Nd) \quad (1)$$

The M detecting circuit 18 has a function of obtaining the frame length L of the orthogonal frequency division multiplex signal based on the length Nd of the data symbol signal and the length Ng of the guard interval symbol which have been detected, and of detecting the number M of the data symbols per frame of the orthogonal frequency division multiplex signal by referring to the communication parameters which are the obtained lengths Ng, Nd, and Np.

Through the processing as described above, among the parameters of the OFDM signals, there are detected the length Np of the pilot symbol, the length Ng of the guard interval symbol, and the length Nd of the OFDM data symbol. As can be seen from FIG. 11, the frame length L of the OFDM signal corresponds to the length from the correlation value peak P1 which is generated in the short period Ng+Nd to the correlation value peak P5 which is generated in the long period Nd+Ng+Np. Thus, the frame length L of the OFDM signal is calculated from the relation shown in FIG. 11.

Figure 11:
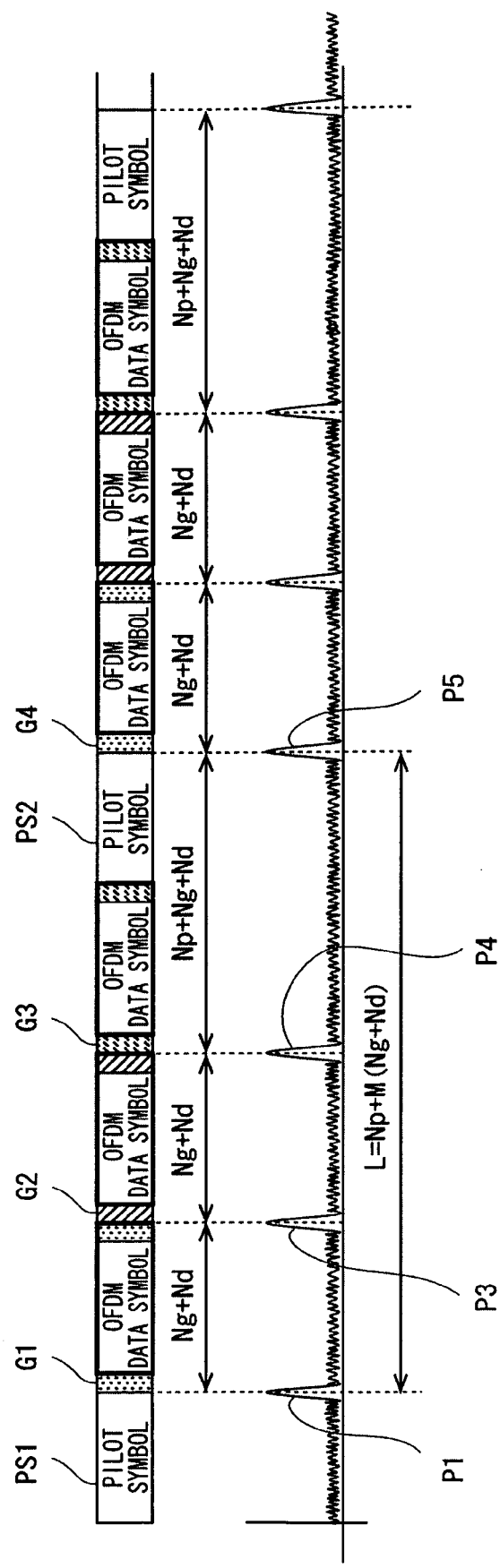
FIG. 11 is a characteristic diagram for showing a result of the correlation processing of FIG. 10B which is performed on a signal with a plurality of orthogonal frequency division multiplex signal frames.

It will be described in detail. By referring to FIG. 1A, it has been described on assumption that the length from the pilot symbol PS1 at the front to the pilot symbol PS2 at the end is the frame length of the OFDM signal. However, in the embodiment, the length from the guard interval symbol G1 following the front pilot symbol PS1 to the pilot symbol PS2 at the end is set as the frame length L of the OFDM signal for performing the sliding processing. The frame lengths L of the OFDM signal in FIG. 1A and FIG. 11 are the same due to the frame structure of the OFDM signal.

In the embodiment of the present invention, in order to perform the correlation processing by carrying out the sliding processing, the correlation value peak P1 is detected at the front position of the guard interval symbol G1. Then, the correlation value peak is detected at the positions of the following guard interval symbols G2, G3 and at the position of the guard interval symbol G4 following the pilot symbol PS2 at the end, respectively. In the case shown in FIG. 11, the length between the correlation value peak P1 at the front and the correlation value peak P5 at the end corresponds to the frame length L of the OFDM signal. That is, the M detecting circuit 18 calculates the frame length L of the OFDM signal based on the sliding amount between the correlation value peaks P1 and P3, between the correlation peak values P3 and P4, and between the correlation value peaks P4 and P5. Then, the M detecting circuit 18 detects the number M of the data symbols per frame based on the information on the frame length L.

The frame length L of the OFDM signal can be expressed as the following expression (2) where the number of the data symbols per frame of the OFDM signal is M.

$$L=M(Ng+Nd)+Np \quad (2)$$

From the expression (2), the number M of the data symbols per frame of the OFDM signal can be expressed as follows.

$$M=(L-Np)/(Ng+Nd) \quad (3)$$

As described above, the frame length L of the OFDM signal has been detected. Thus, based on the expression (3), the number M of the data symbols per frame of the OFDM signal is calculated.

Next, described is a method for detecting the modulating parameter of the orthogonal frequency division multiplex signal using an OFDM modulating parameter detecting apparatus 10 according to the embodiment of the present invention.

As shown in FIG. 1A, in the OFDM signal, there are pilot symbols arranged at the front and end in the time base direction and a plurality of sets of guard interval symbols and OFDM data symbols are arranged between the pilot symbols. At the front of the OFDM data symbol which is shown in FIG. 1A, the guard interval symbol which is a copy of a part of the OFDM data symbol as the transmission data is added as shown in FIG. 1B. The above-described guard interval symbol protects the orthogonal characteristic of the transmission signal from the influence of multi-carriers. At the same time, it is a signal structure peculiar to the OFDM signal which is used for synchronizing when performing demodulation processing on the orthogonal frequency division multiplex signal.

For detecting each of the signal parameters of the OFDM signal, the embodiment of the present invention utilizes the periodicity of the guard interval symbol so as to detect the length Nd of the OFDM data symbol of the OFDM signal, and detects other parameters based on the detected length Nd of the OFDM data symbol. In the followings, it will be described in detail.

Figure 4:
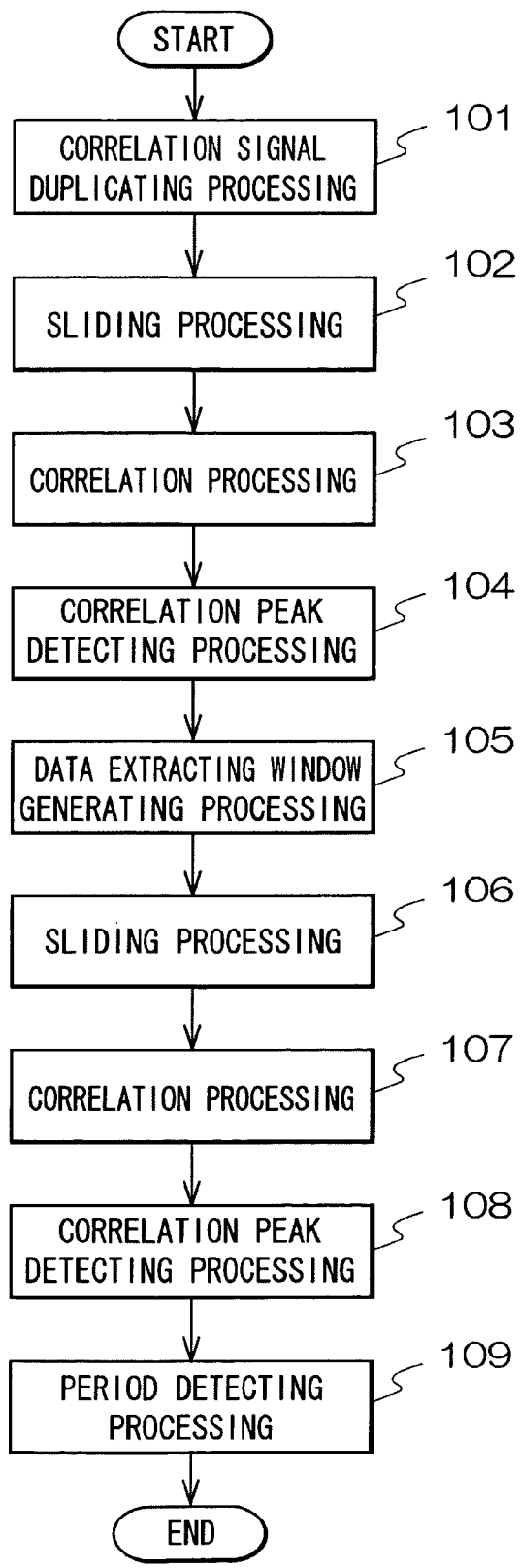
FIG. 4 is a flowchart for showing operation of the modulating parameter detecting apparatus of the orthogonal frequency division multiplex signal shown in FIG. 1.

In FIG. 4, processing is performed at first on the received OFDM signal for detecting the length Nd of the OFDM data symbol (steps 101-104). Then, processing is performed for detecting the length Np of the pilot symbol, the length Ng of the guard interval symbol, and the number M of the data symbols (steps 105-109) based on the obtained length Nd of the OFDM data symbol.

First, described is the processing for detecting the length Nd of the PFDM symbol data (steps 101-104). Upon receiving the OFDM signal, the correlation signal duplicating circuit 11 duplicates the correlation signal from the received OFDM signal (step S101). Specifically, the correlation signal duplicating circuit 11 copies the received OFDM signal and produces the copied OFDM signal as the correlation signal.

Upon receiving the correlation duplicate signal which has been duplicated, the autocorrelation circuit 12, as shown in FIG. 5, performs sliding processing on the duplicate signal in the time base direction with respect to the received signal D1 which is the OFDM signal (step 102).

As shown in a) of FIG. 5, the autocorrelation circuit 12 performs he sliding processing by setting the sliding amount N as 0 for performing the correlation processing of the duplicate signal D2 with the sliding amount N of 0 and the received signal D1 (step 103), and outputs the correlation-processed data to the Nd detecting circuit 13. The Nd detecting circuit 13 receives the result of the correlation processing and detects the correlation value peak of the received signal D1 and the correlation signal D2 (step 104). In this case, the sliding amount N is set as 0. Thus, as shown in a) of FIG. 5, the received signal D1 and the correlation signal D2 are completely consistent with each other so that there generates a large correlation value peak.

In the step 102, the autocorrelation circuit 12 performs the sliding processing by variably setting the sliding amount N from 0 as the initial value to N<Nd, N=Nd, and to N>Nd. In the step 103, the autocorrelation circuit 12 performs the correlation processing one after another on the correlation signal D2 and the received signal D1 under the state where the sliding amount N shown in a) of FIG. 5 is variably set as N<Nd, N=Nd, and N>Nd. In the step 104, the Nd detecting circuit 13 calculates the correlation value of the received signal D1 and the correlation signal D2. As a characteristic of the OFDM signal, as shown in FIG. 1A and FIG. 1B, a signal which is a copy of a part of the OFDM data symbol is added to the front of the OFDM data symbol as the guard interval symbol. Therefore, as the result of the correlation processing between the guard interval symbols, the correlation value having a large peak can be obtained.

It will be described in detail. When the sliding amount is N<Nd as shown in a) of FIG. 5, it is correlation processing for non-correlation signal. Thus, there is no peak of the correlation value detected by the correlation processing of the received signal D1 and the correlation signal D2. When the sliding amount N is N=Nd as shown in c) of FIG. 5, it is the correlation processing between the guard interval symbols. Thus, there is a correlation value having a large peak is detected as the correlation value peak obtained by the correlation processing of the received signal D1 and the correlation signal D2. When the sliding amount is N>Nd as shown in d) of FIG. 5, it again becomes the correlation processing for non-correlation signal. Thus, there is no peak of the correlation value detected by the correlation processing of the received signal D1 and the correlation signal D2.

As described above, the autocorrelation circuit 12 performs the sliding processing by variably setting the sliding amount N (N=0, N<Nd, N>Nd) in order and performs the correlation processing on the correlation signal D2 with the variably set sliding amount and the received signal D1. When the Nd detecting circuit 13 receives the correlation-processed data and detects the correlation value peaks of the received signal D1 and the correlation signal D2, there are correlation value peaks detected when the sliding amount N is 0 and when the sliding amount N is Nd as shown in FIG. 6.

As can be seen from FIG. 6, the distance between the peak of the correlation value where the sliding amount N is 0 and the peak where the sliding amount N is Nd corresponds to the length Nd of the OFDM data symbol of FIG. 1A. That is, the sliding amount between the correlation peaks where the correlation value shows large peaks is consistent with the length Nd of the OFDM data symbol. Thus, the Nd detecting circuit 13 detects the sliding amount between the above-described correlation peaks as the length Nd of the OFDM data symbol. In FIG. 6, the sliding amount N is the horizontal axis and the correlation value peak as a result of the correlation processing is the vertical axis. FIG. 6 shows changes in the correlation value peak as a result of the correlation processing when the sliding amount is taken as a parameter.

By the processing as described above, the embodiment of the present invention enables to detect the length Nd of the OFDM data symbol based on the OFDM signal with no known information.

Next, described is processing for detecting the length Ng of the guard interval symbol based on the obtained length Nd of the OFDM data symbol.

In the step 105, the window generating circuit 14 obtains the information on the length Nd of the OFDM data symbol which is detected by the Nd detecting circuit 13, and generates a pair of data extracting windows W1, W2 for correlation processing having, therebetween, a distance which corresponds to the length Nd of the OFDM data symbol as shown in FIG. 8 (data extracting window generating processing).

In the step 106, upon receiving information on the generated data extracting windows W1, W2 from the window generating circuit 14, the data correlation circuit 15 performs sliding processing in the time base direction with respect to the received signal D1 by changing the sizes S of the data extracting windows W1, W2. In the step 107, by the sliding processing, the data correlation circuit 15 extracts a specific part of the data from the received signal D1 through the data extracting windows W1, W2, and performs mutual correlation processing of the extracted data D3 and D4.

In the step 108, based on the correlation processing outputted from the data correlation circuit 15, the Ng detecting circuit 16 detects the correlation value peak which is obtained when the sizes S of the data extracting windows W1, W2 are consistent with the length Ng of the guard interval symbol. Thereby, the length Ng of the guard interval symbol in the orthogonal frequency division multiplex signal is detected.

In the step 109, the Np detecting circuit 17 detects the correlation value peak which is equal to or larger than the threshold value based on the correlation processing of the data W3, W4 extracted through the data extracting windows W1, W2, under the condition where the distance between the data extracting windows W1 and W2 is the detected length Nd of the OFDM data symbol. Thereby, the length Np of the pilot symbol is detected.

That is, the Np detecting circuit 17 detects the length Np of the pilot symbol by the following expression (1) by using the data length Ng of the guide interval signal and the length Nd of the OFDM data symbol which have been detected so far among the parameters of the OFDM signal.

$$Np=X2-(Ng+Nd) \quad (1)$$

In the step 109, the M detecting circuit 18 detects the frame length L of the orthogonal frequency division multiplex signal based on the length Nd of the data symbol, the length Ng of the guard interval symbol and the length Np of the pilot symbol which have been detected, and detects the number M of the data symbols per frame of the orthogonal frequency division multiplex signal by referring to the obtained communication parameters.

Specifically, through the processing as described above, among the parameters of the OFDM signals, there are detected the length Np of the pilot symbol, the length Ng of the guard interval symbol, and the length Nd of the OFDM data symbol. As can be seen from FIG. 11, the frame length L of the OFDM signal corresponds to the length from the correlation value peak P1 which is generated in the short period Ng+Nd to the correlation value peak P5 which is generated in the long period Nd+Ng+Np. Thus, the frame length L of the OFDM signal is calculated from the relation shown in FIG. 11.

The frame length L of the OFDM signal can be expressed as the following expression (2) where the number of the data symbols per frame of the OFDM signal is M.

$$L=M(Ng+Nd)+Np \quad (2)$$

From the expression (2), the number M of the data symbols per frame of the OFDM signal can be expressed as follows.

$$M=(L-Np)/(Ng+Nd) \quad (3)$$

As described above, the frame length L of the OFDM signal has been detected. Thus, based on the expression (3), the number M of the data symbols per frame of the OFDM signal is calculated by the M detecting circuit 18.

As described above, in the embodiment of the present invention, the length Nd of the OFDM data symbol of the received OFDM signal is detected through correlation processing by utilizing the periodicity of the guard interval symbol. Further, the length Ng of the guard interval symbol is detected based on the length Nd of the OFDM data symbol by detecting the correlation value through performing the sliding processing using the data extracting windows whose window sizes can be varied. Furthermore, based on the length Ng of the guard interval symbol, two specific periodicities are calculated from the result of the correlation value against the sliding amount so as to detect the length Np of the pilot data symbol and the multiplex number M of the OFDM data symbol per frame of the OFDM signal.

In the description provided above, as shown in FIG. 1A and FIG. 1B, described is the case of detecting the communication parameter from the multiplex modulating signal which has the signal structure wherein the signal that is a copy of a part of the data symbol is added to the front of the data symbol as the guard interval symbol and the pilot symbol is added in front of the guard interval symbol. However, it is not limited to this.

That is, in the case of the multiplex modulating signal with the signal structure wherein the signal that is a copy of a part of the data symbol is added to the front of the data symbol as the guard interval symbol, the pilot symbol may be inserted within the data symbol. In that case, the pilot symbol cannot function as the pilot signal. In that condition, processing may be performed for detecting, as the communication parameters, only the length Nd of the data symbol and the length Ng of the guard interval symbol in the multiplex modulating signal.

Further, the communication parameter detecting apparatus according to the embodiment of the present invention is built as a hardware apparatus as shown in FIG. 3. However, the functions of the communication parameter detecting apparatus of FIG. 3, which performs the processing shown in FIG. 4, may be executed by a computer. In that case, a program for detecting the communication parameter to be mounted to a computer is built to have a following structure.

That is, as shown in FIG. 1A and FIG. 1B, in the case where the multiplex modulating signal has the signal structure wherein the signal that is a copy of a part of the data symbol is added to the front of the data symbol as the guard interval symbol and the pilot symbol is added in front of the guard interval symbol, the pilot symbol functions as the pilot signal. Therefore, it is necessary to detect the communication parameter including the length Np of the pilot symbol. The communication parameter detecting program according to the embodiment of the present invention, which is targeted for the multiplex modulating signal having such structure, executes by a computer used for detecting a modulating parameter of a multiplex modulating signal, a function of generating a duplicate signal for correlation processing based on a multiplex modulating signal;

a function of performing autocorrelation processing through carrying out sliding processing on the duplicate signal with respect to a received signal as the multiplex modulating signal;

a function of detecting length of a data symbol of a multiplex modulating signal by detecting, from a correlation value output which is outputted by the autocorrelation processing, a correlation value peak obtained according to guard interval symbols which are identical signal components present in the received signal;

a function of generating a pair of data extracting windows for correlation processing, the windows having different window sizes and a space therebetween which corresponds to the detected length of the data symbol;

a function of performing correlation processing mutually on extracted data which are extracted through the data extracting windows through the sliding processing by changing the window sizes;

a function of detecting length of the guard interval symbol of the multiplex modulating signal by detecting a correlation value peak which is obtained when the length of the guard interval symbol and the window size become consistent in the correlation processing performed mutually on the extracted data;

a function of detecting length of a pilot symbol of the multiplex modulating signal by obtaining periodicity of the correlation value peak based on a result of the correlation processing of data which is extracted through the data extracting windows of different sizes and distance information of the adjacent correlation value peaks with different periodicities under a condition where the space between the pair of data extracting windows is the length of the data symbol; and a function of detecting a number of data symbols of the multiplex modulating signal per frame by detecting frame length of the multiplex modulating signal according to the detected lengths of the data symbol, the guard interval symbol, and the pilot symbol, and by referring to each of the symbol lengths as communication parameters.

That is, in the case of the multiplex modulating signal with the signal structure wherein the signal that is a copy of a part of the data symbol is added to the front of the data symbol as the guard interval symbol, the pilot symbol may be inserted within the data symbol. In that case, the pilot symbol cannot function as the pilot signal. In that condition, processing maybe performed for detecting, as the communication parameters, only the length Nd of the data symbol and the length Ng of the guard interval symbol in the multiplex modulating signal.

Second Embodiment

Figure 12:
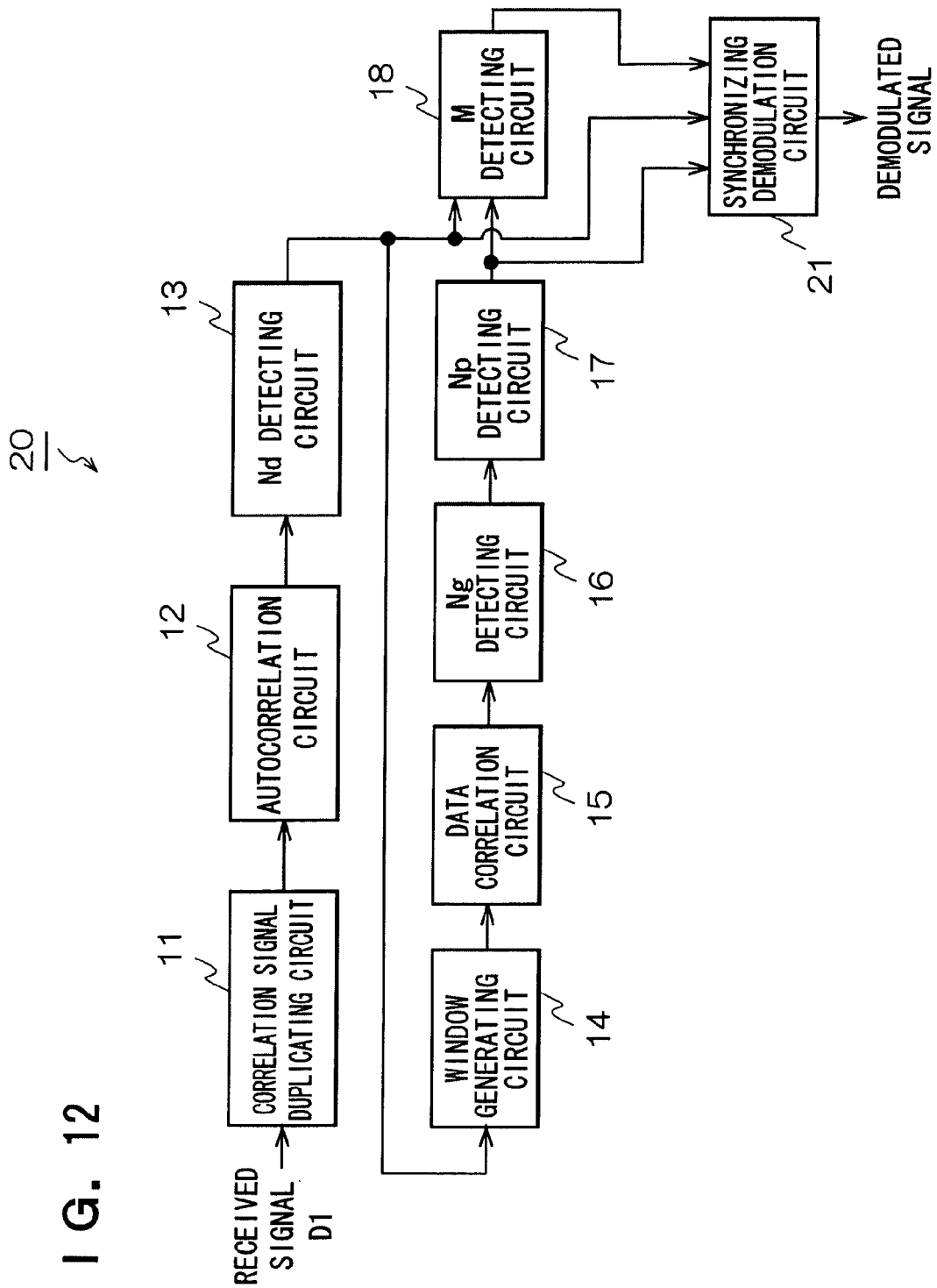
FIG. 12 is a functional block diagram for showing a synchronizing demodulation apparatus of the orthogonal frequency division multiplex signal according to an embodiment of the present invention.
Figure 13:
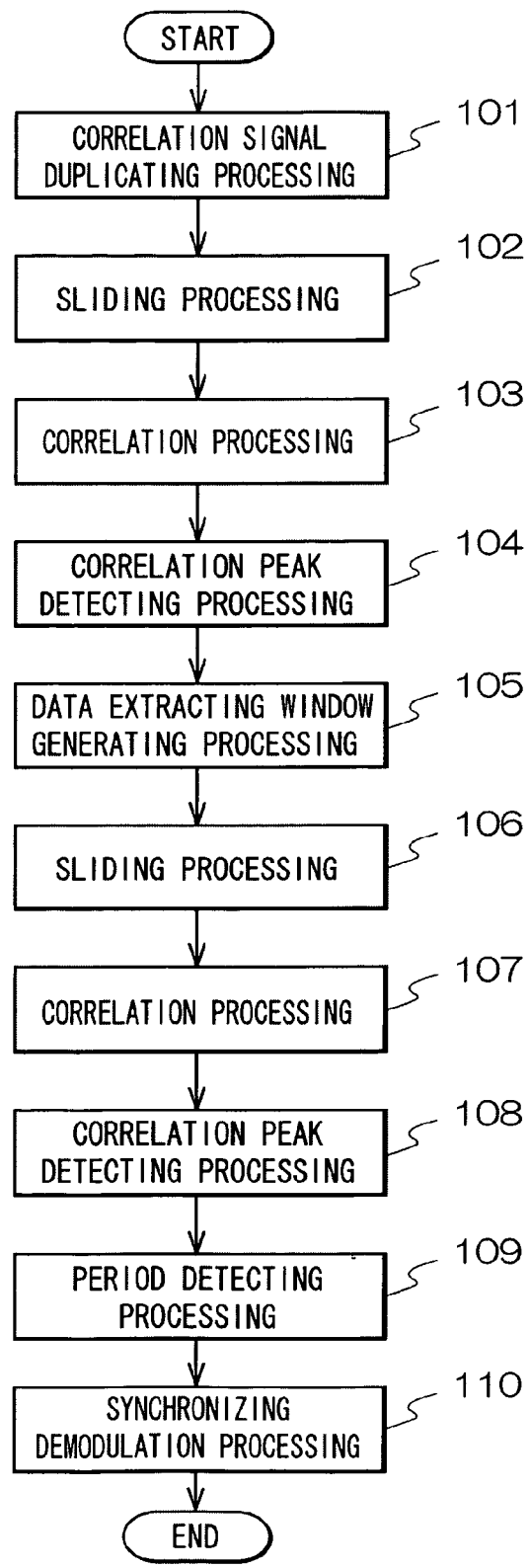
FIG. 13 is a flowchart for showing operation of the synchronizing demodulation apparatus of the orthogonal frequency division multiplex signal shown in FIG. 12.

FIG. 12 and FIG. 13 show an embodiment of an OFDM modulating signal synchronizing demodulation apparatus according to the present invention. FIG. 12 is a functional block diagram and FIG. 13 is a flowchart for showing the operation. There is provided a description hereinafter by referring to the drawings. However, description of the same components as those in FIG. 3 and FIG. 4 will be omitted by simply applying the same reference numerals.

A synchronizing demodulation apparatus 20 of the orthogonal frequency division multiplex signal according to the embodiment of the present invention is obtained by adding, to the modulating parameter detecting apparatus 10 of the orthogonal frequency division multiplex signal shown in FIG. 3, a synchronizing demodulation circuit 21 which achieves synchronizing demodulation processing of a received signal based on the OFDM parameter obtained by the modulating parameter detecting apparatus 10. The synchronizing demodulation circuit 21 itself is the same as the conventional ones. However, the OFDM parameters to be used are not the known information but are obtained by the OFDM modulating parameter detecting apparatus 10. In other words, use of the result of the detection obtained by the OFDM modulating parameter detecting apparatus 10 enables to perform demodulation processing on the received OFDM signal with unknown parameters.

As shown in FIG. 12, the synchronizing demodulation apparatus 20 of the orthogonal frequency division multiplex signal according to the embodiment of the present invention is built to comprise, as a basic structure:

a correlation signal generating circuit 11 which generates a duplicate signal for correlation processing based on the orthogonal frequency division multiplex signal;

an autocorrelation circuit 12 which performs autocorrelation processing through carrying out sliding processing on the duplicate signal with respect to a received signal as the orthogonal frequency division multiplex signal;

an Nd detecting circuit 13 which detects length of a data symbol of the orthogonal frequency division multiplex signal by detecting, from a correlation value output which is outputted by the autocorrelation processing, a correlation value peak obtained according to guard interval symbols which are identical signal components present in the received signal;

a window generating circuit 14 for generating a pair of data extracting windows for correlation processing, the windows having different window sizes and a space therebetween which corresponds to the detected length of the data symbol;

a data correlation circuit 15 which performs correlation processing performed mutually on extracted data which are extracted through the data extracting windows through the sliding processing by changing the window sizes;

an Ng detecting circuit 16 which detects length of the guard interval symbol of the orthogonal frequency division multiplex signal by detecting a correlation value peak which is obtained when the length of the guard interval symbol and the window size become consistent based on the correlation processing performed mutually on the extracted data;

an Np detecting circuit 17 which detects length of a pilot symbol of the multiplex modulating signal by obtaining periodicities of the correlation value peaks based on a result of the correlation processing of data which are extracted through the data extracting windows of different sizes and distance information of the adjacent correlation value peaks with different periodicities, under a condition where the space between the pair of data extracting windows is the length of the data symbol;

an M detecting circuit 18 which detects a number of data symbols of the multiplex modulating signal per frame by obtaining frame length of the multiplex modulating signal according to the detected lengths of the data symbol, the guard interval symbol, and the pilot symbol, and by referring to each of the symbol lengths as communication parameters; and the synchronizing demodulation circuit 21 which performs synchronizing demodulation on the orthogonal frequency division multiplex signal according to the obtained communication parameters.

Needless to say, the present invention is not limited to each of the above-described embodiments. For example, modifications such as distributions of the functions through isolating or combining each function, changing each order, etc. can be done at will as long as the functions can be achieved.

As described above, in the present invention, the OFDM data symbol is detected through the correlation processing by utilizing the periodicity of the guard interval symbol and, based on the result, extraction of the specific data, correlation processing, and detection of the correlation peak and the periodicity are performed. Thereby, it enables to detect the guard interval symbol length, the pilot symbol length, and the number of the OFDM data symbols by blind processing without prior information.

What is claimed is:

1. A communication parameter detecting apparatus, comprising:

a correlation signal generating circuit which generates a duplicate signal for correlation processing based on a multiplex modulating signal;

an autocorrelation circuit which performs autocorrelation processing through carrying out sliding processing on the duplicate signal with respect to a received signal as the multiplex modulating signal;

an Nd detecting circuit which detects length of a data symbol of a multiplex modulating signal by detecting, from a correlation value output which is outputted by the autocorrelation processing, a correlation value peak obtained according to guard interval symbols which are identical signal components present in the received signal;

a window generating circuit for generating a pair of data extracting windows for correlation processing, the windows having different window sizes and a space therebetween which corresponds to the detected length of the data symbol;

a data correlation circuit which performs correlation processing mutually on extracted data which are extracted through the data extracting windows through the sliding processing by changing the window sizes; and an Ng detecting circuit which detects length of the guard interval symbol of the multiplex modulating signal by detecting a correlation value peak which is obtained when the length of the guard interval symbol and the window size become consistent based on the correlation processing performed mutually on the extracted data.

2. The communication parameter detecting apparatus according to claim 1, wherein the multiplex modulating signal has a signal structure in which a signal that is a copy of a part of the data symbol is added to a front of the data symbol as the guard interval symbol.

3. The communication parameter detecting apparatus according to claim 1, wherein:

the multiplex modulating signal has a signal structure in which a signal that is a copy of a part of the data symbol is added to a front of the data symbol as the guard interval symbol and a pilot symbol is added in front of the guard interval symbol; and the communication parameter detecting apparatus further comprises an Np detecting circuit which detects length of the pilot symbol of the multiplex modulating signal by obtaining periodicities of the correlation value peaks based on a result of the correlation processing of data which are extracted through the data extracting windows of different sizes and distance information of the adjacent correlation value peaks with different periodicities under a condition where the space between the pair of data extracting windows is the length of the data symbol, and an M detecting circuit which detects a number of data symbols of the multiplex modulating signal per frame by obtaining frame length of the multiplex modulating signal according to the detected lengths of the data symbol, the guard interval symbol, and the pilot symbol, and by referring to each of the symbol lengths as communication parameters.

4. The communication parameter detecting apparatus according to claim 3, wherein the Np detecting circuit has a function of obtaining the periodicity of the correlation value peak by using a threshold value which can be set variably.

5. The communication parameter detecting apparatus according to claim 1, wherein the Nd detecting circuit has a function of detecting the correlation value peak by using a threshold value which can be set variably.

6. The communication parameter detecting apparatus according to claim 1, wherein the Ng detecting circuit has a function of detecting the correlation value peak by the correlation processing performed mutually on the extracted data by using a threshold value which can be set variably.

7. A communication parameter detecting method, comprising:

an autocorrelation step of performing autocorrelation processing through carrying out sliding processing on a duplicate signal for correlation processing, which is generated based on a multiplex modulating signal, with respect to a received signal as the multiplex modulating signal;

an Nd detecting step of detecting length of a data symbol of a multiplex modulating signal by detecting, from a correlation value output which is outputted by the autocorrelation processing, a correlation value peak obtained according to guard interval symbols which are identical signal components present in the received signal;

a data correlation step of performing correlation processing mutually on extracted data which are extracted through a pair of data extracting windows through the sliding processing by changing the window sizes, in which the windows have different window sizes and a space therebetween which corresponds to the detected length of the data symbol; and an Ng detecting step of detecting length of the guard interval symbol of the multiplex modulating signal by detecting a correlation value peak which is obtained when the length of the guard interval symbol and the window size become consistent in the correlation processing performed mutually on the extracted data.

8. The communication parameter detecting method according to claim 7, wherein the communication parameter is detected from the multiplex communication signal with a signal structure in which a signal that is a copy of a part of the data symbol is added to a front of the data symbol as the guard interval symbol.

9. The communication parameter detecting method according to claim 7, which is targeted at the multiplex communication signal with a signal structure in which a signal that is a copy of a part of the data symbol is added to a front of the data symbol as the guard interval symbol and a pilot symbol is added in front of the guard interval symbol, the method further comprising:

an Np detecting step of detecting length of a pilot symbol of the multiplex modulating signal by obtaining periodicities of the correlation value peaks based on a result of the correlation processing of data which are extracted through the data extracting windows of different sizes and distance information of the adjacent correlation value peaks with different periodicities under a condition where the space between the pair of data extracting windows is the length of the data symbol; and an M detecting step of detecting a number of data symbols of the multiplex modulating signal per frame by obtaining frame length of the multiplex modulating signal according to the detected lengths of the data symbol, the guard interval symbol, and the pilot symbol, and by referring to each of the symbol lengths as communication parameters.

10. The communication parameter detecting method according to claim 9, wherein, in the Np detecting step, the periodicities of the correlation value peaks are obtained by using a threshold value which can be set variably.

11. The communication parameter detecting method according to claim 7, wherein, in the Nd detecting step, the correlation value peak is detected by using a threshold value which can be set variably.

12. The communication parameter detecting method according to claim 7, wherein, in the Ng detecting step, the correlation value peak is detected by the correlation processing performed mutually on the extracted data by using a threshold value which can be set variably.

* * * * *

UNITED STATES PATENT AND TRADEMARK OFFICE
CERTIFICATE OF CORRECTION

PATENT NO. : 7,570,577 B2 Page 1 of 1
APPLICATION NO. : 11/224794
DATED : August 4, 2009
INVENTOR(S) : Hiroyuki Ishii It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 995 days.

Signed and Sealed this

Seventh Day of September, 2010

David J. Kappos
*Director of the United States Patent and Trademark Office*